(12) United States Patent
Vanninen

(10) Patent No.: US 11,681,453 B2
(45) Date of Patent: Jun. 20, 2023

(54) DATA DEDUPLICATION PARAMETER COMPUTATION

(71) Applicant: HEWLETT PACKARD ENTERPRISE DEVELOPMENT LP, Houston, TX (US)

(72) Inventor: Matti Vanninen, Cary, NC (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 211 days.

(21) Appl. No.: 17/029,591

(22) Filed: Sep. 23, 2020

(65) Prior Publication Data

US 2022/0091766 A1    Mar. 24, 2022

(51) Int. Cl.
G06F 3/06    (2006.01)

(52) U.S. Cl.
CPC .......... *G06F 3/0641* (2013.01); *G06F 3/0608* (2013.01); *G06F 3/0629* (2013.01); *G06F 3/0673* (2013.01)

(58) Field of Classification Search
CPC .... G06F 3/0641; G06F 3/0608; G06F 3/0629; G06F 3/0673
USPC ......................................................... 707/692
See application file for complete search history.

(56) References Cited

U.S. PATENT DOCUMENTS

| | | | |
|---|---|---|---|
| 9,152,333 B1* | 10/2015 | Johnston | G06F 3/067 |
| 9,535,776 B2* | 1/2017 | Klose | G06Q 10/00 |
| 10,037,336 B1* | 7/2018 | Hu | G06F 3/0641 |
| 10,162,867 B2 | 12/2018 | Harnik et al. | |
| 10,169,365 B2 | 1/2019 | Maheshwari | |
| 10,241,680 B2 | 3/2019 | Datar et al. | |
| 10,853,324 B2* | 12/2020 | Dangi | G06F 16/1748 |
| 2011/0238635 A1* | 9/2011 | Leppard | G06F 16/1752 707/693 |
| 2013/0254441 A1 | 9/2013 | Kipnis et al. | |
| 2014/0119231 A1 | 5/2014 | Chan et al. | |
| 2015/0066873 A1* | 3/2015 | Voruganti | G06F 16/1748 707/692 |
| 2018/0074745 A1* | 3/2018 | Harnik | G06F 3/067 |
| 2018/0314435 A1* | 11/2018 | Wu | G06F 3/0608 |
| 2019/0340261 A1* | 11/2019 | Jain | G06F 16/122 |

(Continued)

OTHER PUBLICATIONS

Wikipedia, "Count-distinct problem", available online at <https://en.wikipedia.org/w/index.php?title=Count-distinct_problem&oldid-976929275>, Sep. 5, 2020, 4 pages.

(Continued)

*Primary Examiner* — Hosain T Alam
*Assistant Examiner* — Saba Ahmed
(74) *Attorney, Agent, or Firm* — Trop, Pruner & Hu, P.C.

(57) ABSTRACT

In some examples, a system computes respective values for corresponding data value indicators added to and removed from a deduplication data store in which duplicated data values have been eliminated, where each respective data value indicator of the data value indicators represents presence of a unique data value in the deduplication data store. The system updates an estimator based on the respective values, to reflect an addition of a first data value indicator to the deduplication data store and a removal of a second data value indicator from the deduplication data store. The system computes, using the updated estimator, a parameter relating to data deduplication at the deduplication data store.

20 Claims, 6 Drawing Sheets

(56) References Cited

U.S. PATENT DOCUMENTS

2020/0104175 A1* 4/2020 Theimer ............... G06F 9/5027

OTHER PUBLICATIONS

Durand et al., "Loglog Counting of Large Cardinalities," 2003, ESA 2003, LNCS 2832, pp. 605-617, <http://www.ens-lyon.fr/LIP/Arenaire/SYMPB/teams/algo/algo4.pdf>.

Flajolet, P., et al.; "Probabilistic counting algorithms for data base applications"; May 24, 2006; 30 pages.

Freitag, M., et al.; "Every Row Counts: Combining Sketches and Sampling for Accurate Group-By Result Estimates"; Jan. 2019; 14 pages.

Harnik, D. et al.; "Sketching Volume Capacities in Deduplicated Storage"; Dec. 2019; 23 pages.

Heule et al., "HyperLogLog in Practice: Algorithmic Engineering of a State of The Art Cardinality Estimation Algorithm," EDBT/ICDT '13, Mar. 18-22, 2013, <https://stefanheule.com/papers/edbt13-hyperloglog.pdf> (10 pages).

Lang, Back to the Future: an Even More Nearly Optimal Cardinality Estimation Algorithm, Aug. 22, 2017 (14 pages).

Nazi, A.; et al.; "Efficient Estimation of Inclusion Coefficient using HyperLogLog Sketches"; Jun. 1, 2018; 13 pages.

Wikipedia, "HyperLogLog," Jan. 7, 2017, <https://en.wikipedia.org/w/index.php?title=HyperLogLog&oldid=758719094> (7 pages).

Xie, F. et al.; "Estimating Duplication by Content-based Sampling"; 2013; 6 pages.

* cited by examiner

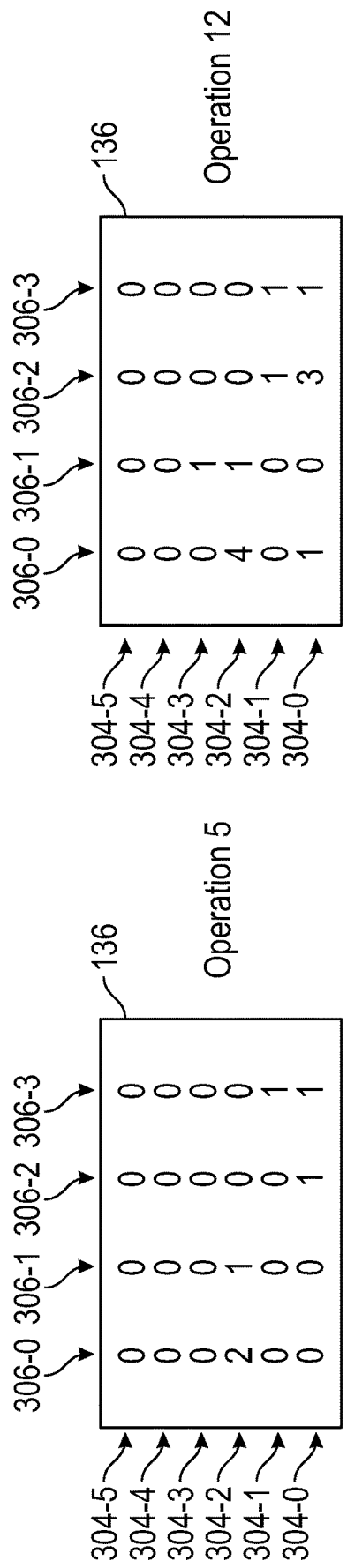
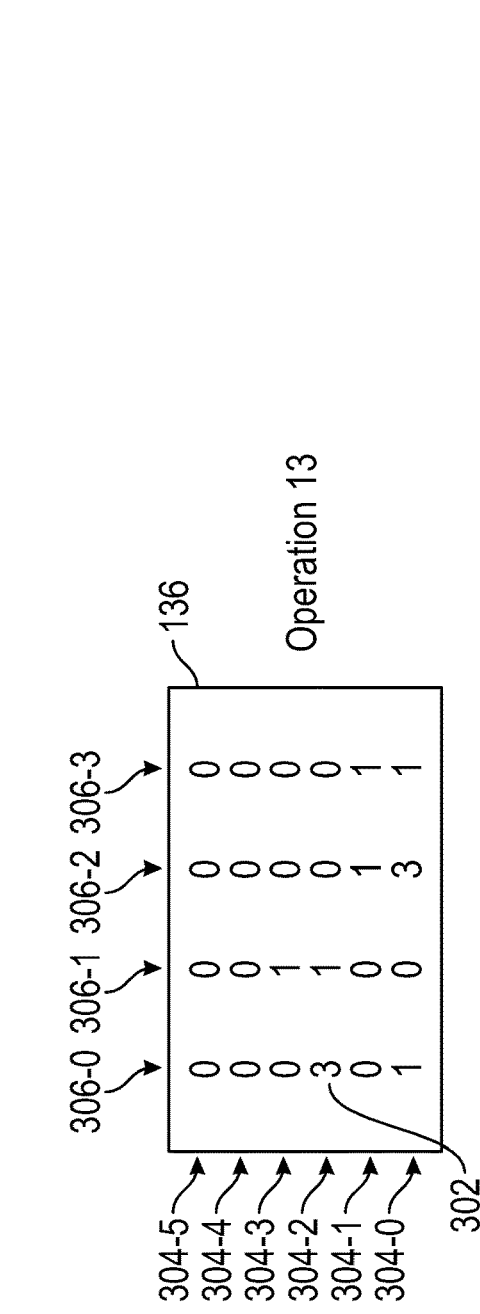

DATA DEDUPLICATION PARAMETER COMPUTATION

BACKGROUND

A data storage system can be used to store data. In some examples, data deduplication can be applied to reduce an amount of data stored by the data storage system. Data deduplication identifies data values that are duplicative, and seeks to eliminate instances of duplicative data values that are stored in the data storage system.

BRIEF DESCRIPTION OF THE DRAWINGS

Some implementations of the present disclosure are described with respect to the following figures.

FIGS. 3A-3G illustrate contents of a probabilistic cardinality estimator updated by respective operations, according to some examples.

Figure 1:
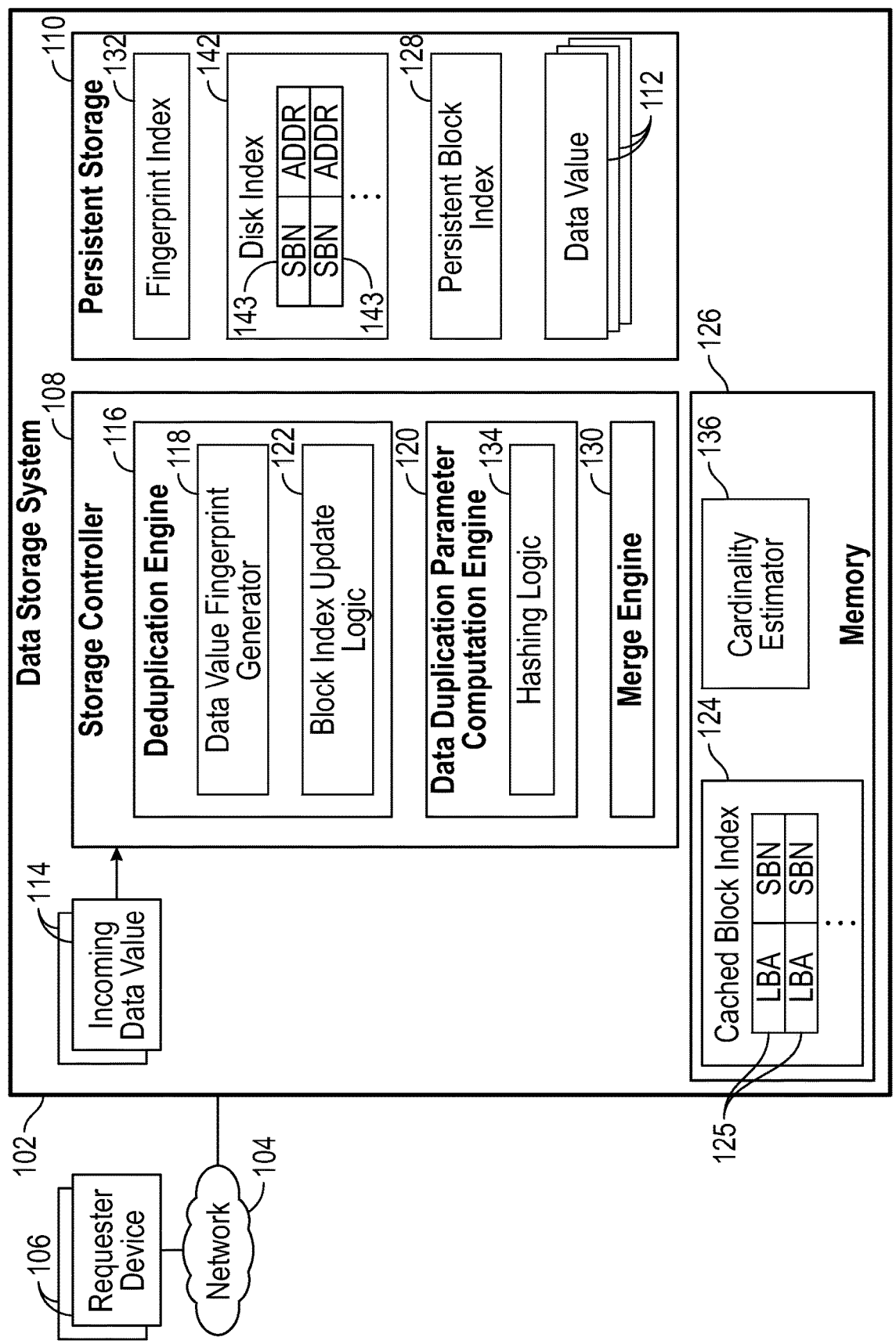
FIG. 1 is a block diagram of an arrangement that includes a storage controller and a persistent storage, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A data storage system can store data in multiple data volumes. Examples of data storage systems include storage arrays, storage appliances, and so forth. A "data volume" refers to a logical collection of data. Logical data blocks can be written to a data volume, in response to write requests from a requester device, such as a server computer, a desktop computer, a notebook computer, a tablet computer, a smartphone, or any other type of electronic device.

The data storage system can perform deduplication of data to reduce or avoid storing of duplicate data values in physical storage media of the data storage system. A "physical storage media" can include a physical storage device or a number of physical storage devices. Examples of physical storage devices include disk-based storage devices, solid state drives, and so forth.

Write requests received by the data storage system are to write logical data blocks to a data volume, or alternatively, to multiple data volumes. Prior to storing a data value of each logical data block to the physical storage media of the data storage system, the data storage system can make a determination of whether the data value of the logical data block is already stored in the data storage system. If so, then the data storage system can elect to not store the data value again (to avoid storing a duplicate of the data value).

In a data storage system with a large number of data volumes where some data volumes may be large, it can be challenging to determine a parameter relating to data deduplication on a per data volume basis. As an example, the parameter can be a deduplication ratio of an individual data volume, which is computed based on a ratio of a quantity of logical data blocks written to the individual data volume, to a quantity of unique data values in the data volume.

Another example parameter of interest is a parameter regarding how many physical blocks can be reclaimed if a data volume were deleted. A "physical block" can refer to a region in the physical storage media of a data storage system, where the region stores a data value. Regions in the physical storage media that make up respective physical blocks can each have a specified fixed size or may have variable sizes.

A further example parameter of interest is a parameter regarding a similarity of multiple data volumes, such as based on a number of shared data values.

In further examples, other parameters relating to data deduplication can be computed on a per data volume basis. More generally, a parameter relating to data deduplication can provide an indication of any or some combination of the following: how effective data deduplication is in reducing the amount of data stored in a data volume, how much physical storage space is taken up by a data volume, how similar data volumes are in data deduplication performance, and so forth.

In accordance with some implementations of the present disclosure, a parameter relating to data deduplication in a data storage system can be computed using a probabilistic cardinality estimator. For example, the probabilistic cardinality estimator can be based on a probabilistic cardinality estimator used by a HyperLogLog algorithm for approximating a number of distinct elements in a data set. In other examples, other types of probabilistic cardinality estimators for estimating a number of distinct data values in a data set can be employed.

The computation of a parameter relating to data deduplication can be performed while the data storage system is online, i.e., the data storage system is active in storing data and/or deleting data in response to incoming requests from a requester device (or alternatively, from multiple requester devices). To enable online computations of parameters relating to data deduplication, the probabilistic cardinality estimator is updated responsive to both additions and removals of data values in the data storage system.

FIG. 1 is a block diagram of an example arrangement that includes a data storage system 102 that is coupled over a network 104 to requester devices 106. Examples of the network 104 include a local area network (LAN), a wide area network (WAN), a storage area network (SAN), or any other type of network (whether wired or wireless).

The data storage system 102 includes a storage controller 108 and a persistent storage 110. The storage controller 108 manages access (read or write) of data values 112 stored at the persistent storage 110 (or more specifically, stored on physical storage media of the persistent storage 110).

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

The persistent storage 110 can be implemented using any or some combination of persistent (e.g., nonvolatile) storage device(s), such as disk-based storage device(s) (e.g., hard disk drive(s) (HDDs)), solid state device(s) (SSDs) (e.g., flash storage device(s)), or the like, or a combination thereof.

In response to write requests received at the data storage system 102, such as from a requester device 106 or from multiple requester devices 106, incoming data values 114 associated with the write requests are received by the storage controller 108. The write requests are requests to write logical data blocks to a data volume (or multiple data volumes). The incoming data values 114 are the data values that are in the logical data blocks written to the data volume(s).

In addition to write requests, the requester devices 106 can also submit read requests to the data storage system 102 to read logical data blocks of the data volume(s), which causes retrieval of corresponding data values 112 stored at the persistent storage 110.

Further, the requester devices 106 can submit requests that cause deletion of data values 112 stored at the persistent storage 110.

The storage controller 108 includes a deduplication engine 116, a data deduplication parameter computation engine 120, and a merge engine 130. As used here, an "engine" can refer to a portion of the hardware processing circuit of the storage controller 108, or to machine-readable instructions executable by the storage controller 108.

The deduplication engine 116 performs data deduplication for the incoming data values 114. The deduplication engine 116 includes a data value fingerprint generator 118 and a block index update logic 122. The data value fingerprint generator 118 and the block index update logic 122 can each be part of the hardware processing circuit or machine-readable instructions of the deduplication engine 116. Although depicted as being part of the deduplication engine 116, the data value fingerprint generator 118 and/or the block index update logic 122 can be separate from the deduplication engine 116.

The data value fingerprint generator 118 compute fingerprints based on the incoming data values 114 (fingerprints are explained further below). The block index update logic 122 is used to update a cached block index 124.

In some examples, a "block index" refers to mapping information that maps addresses identifying logical data blocks (referred to as logical block addresses or LBAs) to corresponding storage location indicators. A storage location indicator provides an indication of a physical storage location storing the data value in the physical storage media. An example of a storage location indicator is a sequential block number (SBN).

An SBN is useable to indicate a physical storage location of a data value 112 stored at the persistent storage 110. However, in some examples, the SBN does not actually identify the physical storage location, but rather, the SBN can be used to derive a physical address or other value that identifies a physical storage location, such as by using a disk index 142 (discussed further below). Although reference is made to "SBN" in the present examples, it is noted that another example of a storage location indicator is a block identifier that identifies blocks and from which a physical storage location can be derived.

The cached block index 124 is stored in a memory 126 of the data storage system 102. A "memory" can be implemented with a memory device or a collection of memory devices. Examples of memory devices can include any or some combination of volatile memory devices (e.g., a dynamic random access memory (DRAM) devices, a static random access memory (SRAM) devices, etc.) and nonvolatile memory devices (e.g., flash memory devices or other types of nonvolatile memory devices).

A persistent block index 128 is stored at the persistent storage 110. Entries 125 of the cached block index 124 are merged, by the merge engine 130 of the storage controller 108, into the persistent block index 128. In some examples, one cached block index 124 is maintained per data volume, and one persistent block index 128 is maintained per data volume. If there are multiple data volumes, then there are respective multiple cached block indexes 124 and persistent block indexes 128.

The merge engine 130 can be triggered to perform the merge in response to an event, such as the cached block index 124 becoming full, or in response to a time event that is triggered periodically or intermittently. The cached block index 124 becoming "full" refers to a storage area allocated to the cached block index 124 in the memory 126 exceeding a specified threshold.

Entries 125 are added to the cached block index 124 by the block index update logic 122 in response to the incoming data values 114. An entry 125 (that contains an LBA mapped to an SBN) is added to the cached block index 124 for a given incoming data value 114. The LBA identifies the logical data block that contains the given incoming data value.

Figure 2:
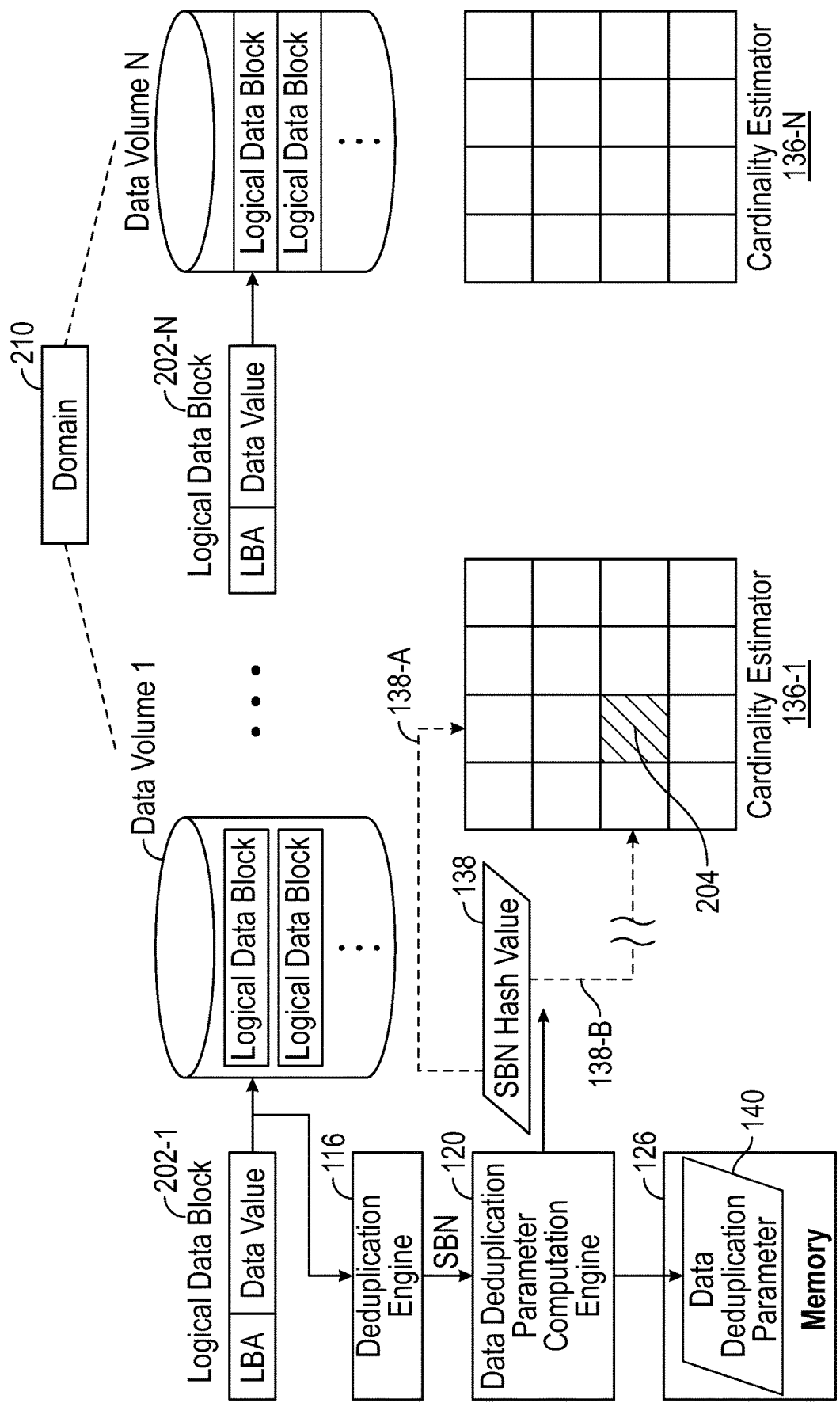
FIG. 2 is a block diagram of an arrangement that includes data volumes and respective probabilistic cardinality estimators, according to some examples.

Referring further to FIG. 2, a logical data block 202-1 is written to data volume 1, and a logical data block 202-N is written to data volume N (where N≥2). In examples according to FIG. 2, the data volumes 1 to N are part of a domain 210. A domain can include one data volume or multiple data volumes. In some examples, the domain 210 can be a deduplication domain, where data values stored in the data volume(s) of the deduplication domain are subject to data deduplication to remove or reduce duplicate data values. A data storage system can include multiple domains in some examples.

Each logical data block 202-$i$ ($i$=1-N) is associated with a respective LBA and a corresponding data value (an incoming data value 114 in FIG. 1). Each data volume 1 to N contains logical data blocks that have been written to the data volume. It is noted that deduplication can be applied on data values of logical data blocks for just a single data volume, or alternatively, on data values of logical data blocks for multiple data volumes.

Note that SBNs represent unique data values stored in the data storage system 102. More specifically, SBNs provide indications of physical storage locations in the physical storage media of the persistent storage at which the corresponding unique data values 112 are stored.

LBAs in the block index (cached block index 124 and/or persistent block index 128) are addresses of the logical data blocks of a data volume. The logical data blocks may or may not contain data values that are duplicative. LBAs of logical data blocks that contain duplicative data values are mapped by respective entries of the block index to the same SBN (that corresponds to a respective data value 112).

In response to a given incoming data value 114, the deduplication engine 116 makes a determination of whether a duplicate data value 112 is already stored at the persistent storage 110. If so, the given incoming data value 114 is not stored again at the persistent storage 110, to avoid storing of duplicative data values. Instead, deduplication engine 116 updates metadata (not shown) stored at the persistent storage 110 to indicate that a new incoming data value 114 has been received that corresponds to a given data value 112 already stored at the persistent storage 110. The metadata can include a count of how many incoming data values 114 (corresponding to writes of logical data blocks to a data volume) are duplicative of the given data value 112.

The data deduplication performed by the deduplication engine 116 is based on fingerprints generated from the incoming data values 114 by the data value fingerprint generator 118. A "fingerprint" refers to a value derived by applying a function on the content of a data value (where the "content" can include the entirety or a sub-portion of the data value). An example of the function that can be applied includes a hash function that produces a hash value based on the incoming data value 114. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

Fingerprints represent data values stored in the data storage system 102. A fingerprint computed for an incoming data value 114 can be compared to fingerprints stored in a fingerprint index 132. The fingerprint index 132 may be stored at the persistent storage 110. In some cases, a portion of the fingerprint index 132 may be cached in the memory 126. The fingerprint index 132 includes entries corresponding to fingerprints representing data values 112 stored at the persistent storage 110. Each entry of the fingerprint index 132 can map a fingerprint to an SBN, in some examples.

If the fingerprint computed for an incoming data value 114 matches a fingerprint in the fingerprint index 132, then that can be used for making a determination the incoming data value 114 is duplicative of a data value 112 already stored at the persistent storage 110. If a given incoming data value 114 is duplicative of a data value 112 already stored at the persistent storage 110, then the deduplication engine 116 produces a mapping between the LBA of the given incoming data value 114 to the SBN of the data value 112 already stored at the persistent storage 110. This mapping is then added as an entry 125 to the cached block index 124.

If a further incoming data value 114 is not duplicative of a data value 112 already stored at the persistent storage 110, then the deduplication engine 116 produces a further mapping between the LBA of the further incoming data value 114 to a new SBN that provides an indication of the physical storage location for the further incoming data value 114. This further mapping is then added as another entry 125 to the cached block index 124.

The data deduplication parameter computation engine 120 includes a hashing logic 134 that receives an SBN from the deduplication engine 116 for an incoming data value 114. The hashing logic 134 computes an SBN hash value 138 (FIG. 2) by applying a hash function on the SBN provided by the deduplication engine 116. The hashing function applied on the SBN can be the same as or different from a hash function applied by the data value fingerprint generator 118 on an incoming data value 114.

Although examples depicted in FIG. 1 shows the hashing logic 134 for computing hash values based on SBNs, in other examples, the data deduplication parameter computation engine 120 can include a different type of function that when applied on an SBN produces an output value that is used for updating a probabilistic cardinality estimator 136. The cardinality estimator 136 can be stored in the memory 126. In some cases, the cardinality estimator 136 can also be stored at the persistent storage 110.

As further shown in FIG. 2, each data volume can be associated with a corresponding different cardinality estimator. For example, data volume 1 is associated with cardinality estimator 136-1, and data volume N is associated with cardinality estimator 136-N.

In some examples, the cardinality estimator 136 (FIG. 1) includes a data structure that contains counts that are useable to derive an estimated quantity of unique data values stored in the data storage system 102. For example, the data structure can be in the form of an array of counts that is arranged as rows and columns (FIG. 2 shows that each of the cardinality estimators 136-1 and 136-2 includes an array of entries, where each entry includes a respective count).

Although reference is made to a cardinality estimator arranged as an array of counts in some examples, it is noted that a probabilistic cardinality estimator may have other forms in other examples.

In accordance with some implementations of the present disclosure, a count in an entry of the cardinality estimator 136 is updated in response to either an addition of a data value that maps to the entry, or a deletion of a data value that maps to the entry. This ability to update a count in an entry of the cardinality estimator 136 in response to additions and removals of data values provides the capability of the data deduplication parameter computation engine 120 in computing parameters relating to data deduplication while the data storage system 102 is online.

As shown in FIG. 2, the SBN hash value 138 produced by the hashing logic 134 of the data deduplication parameter computation engine 120 for the incoming data value of the logical data block 202-1 maps to an entry 204 of the cardinality estimator 136-1. For example, the SBN hash value 138 can be divided into a first hash portion 138-A that maps to a respective column of the cardinality estimator 136-1, and a second hash portion 138-B that maps to a respective row of the cardinality estimator 136-1. The intersection of the respective column and the respective row mapped by the hash portions 138-A and 138-B is the entry 204 that contains a count. Different values of the first hash portion 138-A map to different columns of the cardinality estimator 136-1, and different values of the second hash portion 138-B can map to different rows of the cardinality estimator 136-1.

In some examples, the second hash portion 138-B does not map directly to a row of the cardinality estimator 136-1. Rather, the data deduplication parameter computation engine 120 can determine how many trailing zeros (a quantity of trailing zeros) are in the second hash portion 138-B. This quantity of trailing zeros of the second hash portion 138-B maps to the respective row of the cardinality estimator 136-1. For example, 0 trailing zeros of the second hash portion 138-B maps to row 0 of the cardinality estimator 136-1, 1 trailing zero of the second hash portion 138-B maps to row 1 of the cardinality estimator 136-1, 2 trailing zeros of the second hash portion 138-B maps to row 2 of the cardinality estimator 136-1, and so forth.

A quantity of trailing zeros of the second hash portion 138-B refers to how many zeros are in the least significant bits of the second hash portion 138-B.

The cardinality estimator 136 can also be referred to as a counting cardinality estimator, since counts are maintained in the cardinality estimator 136 to track a quantity of occurrences of SBNs that have a corresponding characteristic (which in the above example is the number of trailing zeros in an SBN hash value produced from a respective SBN).

Table 1 below provides an example of an SBN hash value 138 produced from an SBN having an example value "A".

TABLE 1

| SBN | A |
|---|---|
| SBN Hash Value | 01101010101000 |
| First Hash Portion | 0110 |
| Second Hash Portion | 1010101000 |
| Trailing Zeroes in Second Hash Portion | 3 |

According to Table 1, the hashing logic 134 computes a corresponding SBN hash value (having a binary sequence 01101010101000) based on the SBN that has value "A".

The SBN hash value (01101010101000) is split into a first hash portion 138-A, which in the example of Table 1 is the first 4 bits of the SBN hash value, i.e., 0110. The second hash portion 138-B includes the remaining bits of the SBN hash value (1010101000).

The data deduplication parameter computation engine 120 counts a quantity of trailing zeros in the second hash portion 138-B. In the example of Table 1, the quantity of trailing zeros is 3, which can map to a respective row (e.g., row 3) of the cardinality estimator. The first hash portion 138-A (0110) maps to a respective column of the cardinality estimator.

In alternative examples, the first hash portion 138-A maps to a row of a cardinality estimator, and the second hash portion 138-B (or more specifically, a quantity of zeros in the second hash portion 138-B) maps to a column of the cardinality estimator.

As incoming data values 114 are stored in the data storage system 102 that result in SBNs added to the block index (either the cached block index 124 or the persistent block index 128), respective counts in the cardinality estimator are incremented.

It is also possible that requests received by the storage controller 108 can result in deletion of data values 112 from the data storage system 102. A data value 112 is deleted from the persistent storage 110 if deletion operations result in no instances of the data value 112 remaining at the persistent storage 110. When the data value 112 is deleted, the corresponding SBN is also deleted. The deduplication engine 116 can provide an indication to the data deduplication parameter computation engine 120 whenever an SBN is deleted. The data deduplication parameter computation engine 120 can detect deletion of an SBN, and can cause a corresponding count in an entry of the cardinality estimator 136 to be decremented.

In alternative examples, instead of incrementing a count in a mapped entry of the cardinality estimator 136 in response to an addition of an SBN to the block index, the count can instead by decremented. In such alternative examples, in response to a deletion of an SBN from the block index, the count in the mapped entry of the cardinality estimator 136 is incremented.

More generally, a count in the mapped entry of the cardinality estimator 136 is advanced (one of incrementing or decrementing) in response to an addition of an SBN, and the count in the mapped entry of the cardinality estimator 136 is reversed (a different one of incrementing or decrementing) in response to a removal of an SBN.

Based on the counts in the cardinality estimator 136-1, the data deduplication parameter computation engine 120 computes a parameter relating data deduplication ("data deduplication parameter 140" in FIG. 2). There can be multiple different data deduplication parameters 140 computed by the data deduplication parameter computation engine 120. The data deduplication parameter(s) 140 can be stored in the memory 126 (and possibly may also be stored in the persistent storage 110).

A similar technique can be applied to compute a parameter relating to data deduplication for data volume N.

The persistent storage 110 also stores a disk index 142, which includes entries 143 that map corresponding SBNs to respective physical storage location identifiers, such as physical addresses ("ADDR" in FIG. 1). To retrieve a data value 112 corresponding to an SBN, the storage controller 108 can access the corresponding entry 143 of the disk index 142, where the entry 143 contains the physical storage location identifier corresponding to the SBN. The physical storage location identifier is then used by the storage controller 108 to retrieve the corresponding data value 112.

Table 3 below shows an example in which the operations 1 to 12 involve additions of SBNs, and operation 13 involves the deletion of an SBN. For example, operation 1 adds SBN "A", operation 2 adds SBN "B", and so forth.

TABLE 2

| Operation | SBN | SBN Hash | Hash Portion A (Column) | Hash Portion B | Trailing Zeros (Row) |
|---|---|---|---|---|---|
| 1 Add | A | 0010100 | 00 (0) | 10100 | 2 |
| 2 Add | B | 1001001 | 10 (2) | 01001 | 0 |
| 3 Add | C | 0100100 | 01 (1) | 00100 | 2 |
| 4 Add | A | 0010100 | 00 (0) | 10100 | 2 |
| 5 Add | D | 1101010 | 11 (3) | 01010 | 1 |
| 6 Add | B | 1001001 | 10 (2) | 01001 | 0 |
| 7 Add | A | 0010100 | 00 (0) | 10100 | 2 |
| 8 Add | E | 0011101 | 00 (0) | 11101 | 0 |
| 9 Add | F | 0111000 | 01 (1) | 11000 | 3 |
| 10 Add | B | 1001001 | 10 (2) | 01001 | 0 |
| 11 Add | A | 0010100 | 00 (0) | 10100 | 2 |
| 12 Add | G | 1010110 | 10 (2) | 10110 | 1 |
| 13 Delete | A | 0010100 | 00 (0) | 10100 | 2 |

Updates of the cardinality estimator 136 in response to the operations are shown in FIGS. 3A-3G.

In response to operation 1 that adds SBN "A", the corresponding SBN hash value (0010100) maps to an entry 302 of the cardinality estimator 136. Specifically, the first hash portion (e.g., 00) maps to column 0 (306-0) of the cardinality estimator 136, and the second hash portion (10100), which has 2 trailing zeros, maps to row 2 (304-2) that corresponds to 2 trailing zeros. The data deduplication parameter computation engine 120 increments the count in the entry 302 (from 0 to 1).

The cardinality estimator 136 has rows 304-0 to 304-5 (that map to second hash portion values with 0 to 5 trailing zeros, respectively), and columns 306-0 to 306-3 (that map to first hash portion values 0 to 3, respectively).

Although FIGS. 3A-3F show the cardinality estimator 136 with specific numbers of rows and columns, the cardinality estimator 136 can have other numbers of rows and columns in other examples.

Figure 3B:
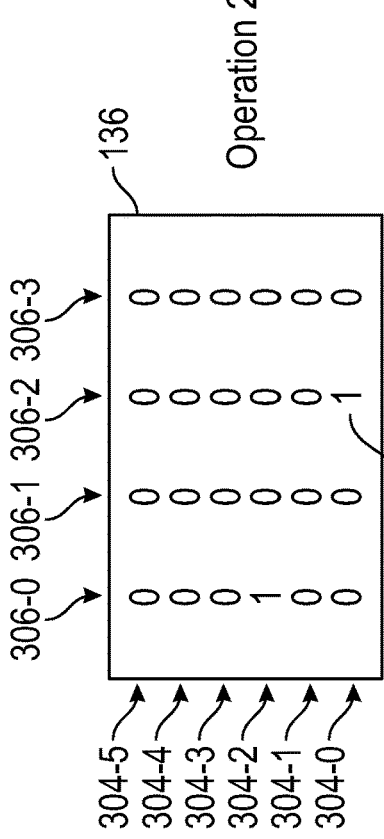
Figure 3D:
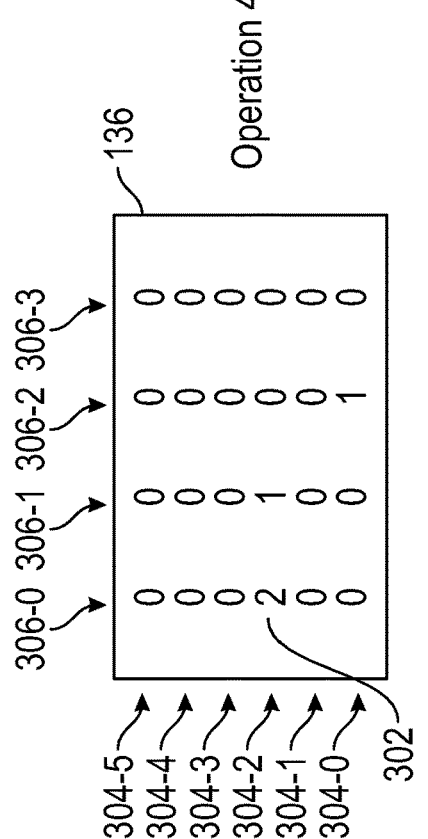
Figure 3A:
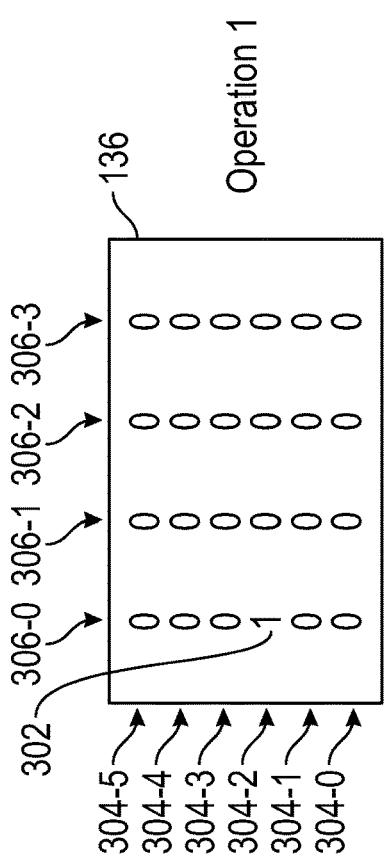

Operation 2 adds SBN "B", which produces an SBN hash value (1001001) that maps to an entry 308 in row 304-0 and column 306-2 (FIG. 3B). The data deduplication parameter computation engine 120 increments the count in the entry 308 (from 0 to 1).

Figure 3C:
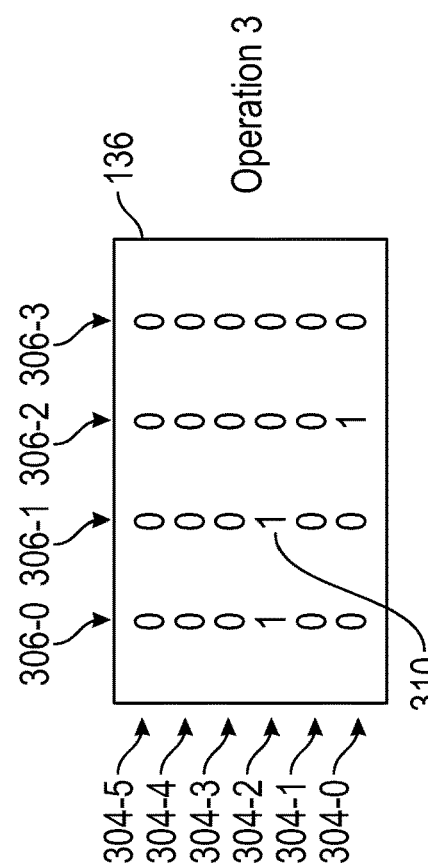

Operation 3 adds SBN "C" which produces an SBN hash value (0100100) that maps to an entry 310 in row 304-2 and column 306-1 (FIG. 3C). The data deduplication parameter computation engine 120 increments the count in the entry 310 (from 0 to 1).

Operation 4 again adds SBN "A", which was also added in operation 1. As a result, the count in the entry 302 is incremented again (from 1 to 2) by the data deduplication parameter computation engine 120.

FIG. 3E shows an update of the cardinality estimator 136 in response to operation 5.

Remaining operations 6-11 result in respective updates (increments) of counts in corresponding entries of the cardinality estimator 136.

FIG. 3G shows an update of the cardinality estimator 136 in response to operation 12.

Operation 13 removes an occurrence of SBN "A", which causes the data deduplication parameter computation engine 120 to decrement the count in the entry 302, from the value 4 in FIG. 3F to the value 3 in FIG. 3G.

The quantity of SBNs for a data volume can be estimated based on the quantity of trailing zeros of an SBN hash value. The quantity of SBNs effectively represents a quantity of unique data values (112 in FIG. 1) that are stored in the data storage system 102 for the data volume.

If a given SBN hash value has NT trailing zeros, then the estimated quantity of SBNs is computed as $2^{NT}$. The foregoing is based on the assumption that about ½ of SBN hash values have 0 trailing zeros, about ¼ of SBN hash values have 1 trailing zero, about ⅛ of SBN hash values have 2 trailing zeros, and so forth. Note that the estimate of the quantity of SBNs based on the number of trailing zeros of an SBN hash value is a rough estimate, which may be inaccurate. To compensate for such inaccuracy, the quantity of SBNs is computed by the data deduplication parameter computation engine 120 using multiple SBN hash values that correspond to the multiple columns of the cardinality estimator 136 (e.g., 4 columns in FIGS. 3A-3G).

Each of the columns of the cardinality estimator 136 can be stored in a respective register. For example, 4 registers can be used to store the 4 columns of the cardinality estimator 136 of FIGS. 3A-3G.

The computation of the quantity of SBNs can occur at any time during the operation of the data storage system 102, such as at any of the times that correspond to operations 1 to 13 in Table 2.

The following assumes that the computation of the quantity of SBNs occurs after operation 13, and is based on the updated cardinality estimator 136 shown in FIG. 3G.

Within each column (register), the data deduplication parameter computation engine 120 determines the highest (maximum) order SBN hash value observed. The maximum order of observed SBN hash values in a column of the cardinality estimator 136 is 1 plus the maximum quantity of trailing zeros observed in the column (1+NT, where NT represents the maximum quantity of trailing zeros observed in the column). For example, in column 306-0 of FIG. 3G, two non-zero entries are observed in respective rows 304-0 and 304-2. The maximum order of observed SBN hash values in the column 306-0 of FIG. 3G is 1+2 (=3). Similarly, the maximum order of observed SBN hash values in the column 306-1 of FIG. 3G is 1+3 (=4), the maximum order of observed SBN hash values in the column 306-2 of FIG. 3G is 1+1 (=2), and the maximum order of observed SBN hash values in the column 306-3 of FIG. 3G is 1+1 (=2).

The data deduplication parameter computation engine 120 then computes the harmonic mean (H) of the maximum orders of the multiple registers (m registers, where m≥2), according to:

$$H = \left( \sum_{j=1}^{m} 2^{-MO[j]} \right)^{-1},$$

where MO[j] is the maximum order of register j (column j in the cardinality estimator 136). In FIG. 3G, m=4.

In some examples, to compensate for hash collisions in the SBN hash values, a correction factor ($b_m m^2$) can be applied to the harmonic mean (Z) as follows:

$$C = b_m m^2 Z.$$

The value of $b_m$ can be based on the value of m, and can be empirically derived based on expected hash collisions.

The value of C is the estimate of the quantity of SBNs in the data storage system 102, which represents an estimate of the quantity of unique data values 112 stored in the data storage system 102.

In some examples, each count in an entry of the cardinality estimator 136 is maintained using a counter that is incremented in response to addition of an SBN that maps to the entry, and decremented in response to removal of an SBN that maps to the entry.

For improved efficiency, the number of bits used for the counter can be reduced. For example, an 8-bit counter can be used. Increasing the number of bits of the counter can improve accuracy in estimating the quantity of SBNs, but comes at the expense of increased processing and storage overhead, since larger counters consume more storage space and produce larger values that may be more processing intensive.

Using a smaller counter may result in overflow, where the counter can increment to a maximum value that can be held by the counter, after which another addition of an SBN that maps to the entry of the counter can cause the counter to reset to zero (an overflow condition). Since the data deduplication parameter computation engine 120 estimates the quantity of SBNs based on multiple registers (columns of the cardinality estimator 136), the overflow condition associated with one of the multiple registers may still provide for an estimate of the quantity of SBNs of acceptable accuracy.

In some examples, for further efficiency from a storage and processing perspective, the cardinality estimator 136 can track SBN hash values that have a specified range of trailing zeros; i.e., the cardinality estimator 136 does not track SBN hash values outside of the specified range. For example, the cardinality estimator 136 can track SBN hash values with greater than equal 10 trailing zeros, and less than or equal 40 trailing zeros. SBN hash values with less than 10 trailing zeros and greater than 40 trailing zeros are ignored and not tracked by the cardinality estimator 136.

In some examples, instead of updating the cardinality estimator 136 as each incoming data value 114 and a respective entry is added to the cached block index 124 for a data volume, the cardinality estimator 136 is updated in response to a merge of the cached block index 124 to the persistent block index 128 by the merge engine 130. This can reduce the frequency of cardinality estimator updates to reduce the processing load associated with computing parameters relating to data deduplication.

The cardinality estimator 136 can also be updated in response to removals of SBNs from the persistent block index 128.

By updating the cardinality estimator 136 responsive to merging of the cached block index 124 and to removals of SBNs from the persistent block index 128, the cardinality estimator 136 can stay consistent with the persistent block index 128.

The estimated quantity of SBNs is an example of a parameter relating to data deduplication that can be computed by the data deduplication parameter computation engine 120.

The data deduplication parameter computation engine 120 can also compute a deduplication ratio (PDR) as another example parameter relating to data deduplication, by dividing the quantity of logical data blocks (Q(logical data blocks)) written to a data volume by the quantity of SBNs (C):

$$PDR = Q(\text{logical data blocks})/C.$$

Another example parameter relating to data deduplication that can be computed by the data deduplication parameter computation engine 120 is a parameter representing a quantity of physical blocks (PReclaim) that can be reclaimed in the persistent storage 110 if data volume i were deleted. This parameter is based on determining a quantity of SBNs present in data volume i but not in any other data volume, computed as:

$$PReclaim = SBNs\_in\_domain - \Sigma_{j \neq i} C_j.$$

In the equation above, SBNs_in_domain represents the quantity of SBNs in a domain of the data storage system 102, where the domain includes multiple data volumes. SBNs_in_domain can be computed by summing $C_1, C_2, \ldots, C_N$, where N represents the quantity of data volumes in the domain, and $C_1, C_2, \ldots, C_N$ represent the estimated quantities of SBNs computed for respective data volumes 1, 2, ..., N using corresponding cardinality estimators 136. In other examples, the value of SBNs_in_domain may be computed using a different technique.

The sum $\Sigma_{j \neq i} C_j$ is the sum of the estimated quantities of SBNs for all data volumes in the domain except data domain i.

Another example parameter relating to data deduplication that can be computed by the data deduplication parameter computation engine 120 is a parameter (PSimilarity) representing similarity of multiple data volumes.

Assume an example where a first cardinality estimator (E1) (an example of 136 discussed above) is used to produce a value C1 that is the estimate of the quantity of SBNs in data volume V1, and a second cardinality estimator (E2) (an example of 136 discussed above) is used to produce a value C2 that is the estimate of the quantity of SBNs in data volume V2.

A simple example is given below that assumes that the data volume V1 has 100 logical data blocks, and the data volume V2 also has 100 logical data blocks. In the example, it is assumed that C1 has value 20, which indicates that the data volume V1 is estimated to have 20 unique data values. Also, C2 also has value 20, which indicates that the data volume V2 is estimated to have 20 unique data values.

In the above example, the deduplication ratio PDR1 for the data volume V1 is 5 (100/20), and the deduplication ratio PDR2 for the data volume V2 is also 5 (100/20).

To determine the similarity of the content of the data volumes V1 and V2, a third cardinality estimator E3 is derived by combining (taking the union) of the cardinality estimator E1 and E2. The union of E1 and E2 is basically a combination of the arrays of counts of E1 and E2 where the counts of corresponding entries in E1 and E2 are added together. If all the data values of the data volume V1 are the same as the data values of the data volume V2, then the cardinality estimator E3 should produce a C3 value of 20. If all the data values of the data volume V1 are different from the data values of the data volume V2, then the cardinality estimator E3 should produce a C3 value of 40. If the cardinality estimator E3 produces a C3 value between 20 and 40, then that indicates that some data values are shared between V1 and V2, and some data values are different between V1 and V2. A value closer to 20 indicates more shared data values, and a value closer to 40 indicates less shared data values.

Although the above simple example assumes the same number of logical data blocks and unique data values in V1 and V2, other examples would include data volumes with different numbers of logical data blocks and different number of unique data values.

More generally, to determine the similarity of multiple data volumes, the cardinality estimators for the multiple data volumes are combined to produce a combined cardinality estimator. The combined cardinality estimator produces an estimate of a quantity of unique data values, where this estimated quantity is compared to a range of quantities of unique data values that starts at a first quantity value indicating that the multiple data volumes share all data values, and ends at a second quantity value indicating that the multiple data volumes do not share any data values. The position of the estimated quantity in the range provides an indication of similarity of the multiple data volumes.

The various parameters relating to data deduplication that are computed by the data deduplication parameter computation engine 120 can be used in any of a number of ways. For example, the parameters relating to data deduplication can be used to determine the performance of the data storage system 102 in applying data deduplication for each respective data volume. For example, if the data deduplication ratio for a given data volume is low (which means that a relatively large number of data values 112 are stored relative to the number of logical data blocks written to the given data volume), then the data storage system 102 can provide a recommendation to delete the given data volume, such as in cases where storage space is running low. A decision by the data storage system 102 to delete a data volume or a group of data volumes (or alternatively to move the data volume or group of data volumes to another domain or another data storage system) can be based on the parameter PReclaim representing a quantity of physical blocks that can be reclaimed in the persistent storage 110 if each respective data volume were deleted. For example, values of the parameter PReclaim for multiple data volumes in a group of data volumes can be combined (e.g., added together) to determine the total number of physical blocks that can be reclaimed from deleting (or moving) the group of data volumes. The parameters can also be used to estimate how much physical space would be consumed if a data volume were moved to another domain. Additionally, the data storage system 102 can provide an indication that multiple data volumes share similar content.

The foregoing refers to using cardinality estimators that are updated as SBNs are added and removed.

In further examples, a further cardinality estimator (similar to those depicted in FIGS. 3A-3G) for example, can be maintained that maps to hash values computed based on data values, rather than SBN hash values. For example, the hash values (referred to as "data hash values") based on data values can be computed by the data value fingerprint generator 118 of FIG. 1.

Each data hash value can similarly be separated into a first hash portion and a second hash portion (similar to 138-A and 138-B discussed above), which map to a respective column and respective row of the further cardinality estimator. Counts in the further cardinality estimator can be updated as data values are added and removed. The storage controller 108 (or a remote computer) can compare the further cardinality estimator computed based on the data values of the data storage system 102 with another further cardinality estimator computed based on the data values of another data storage system. This comparison can reveal the similarity of the different data storage systems in terms of how similar the data values are in the different data storage systems.

Figure 4:
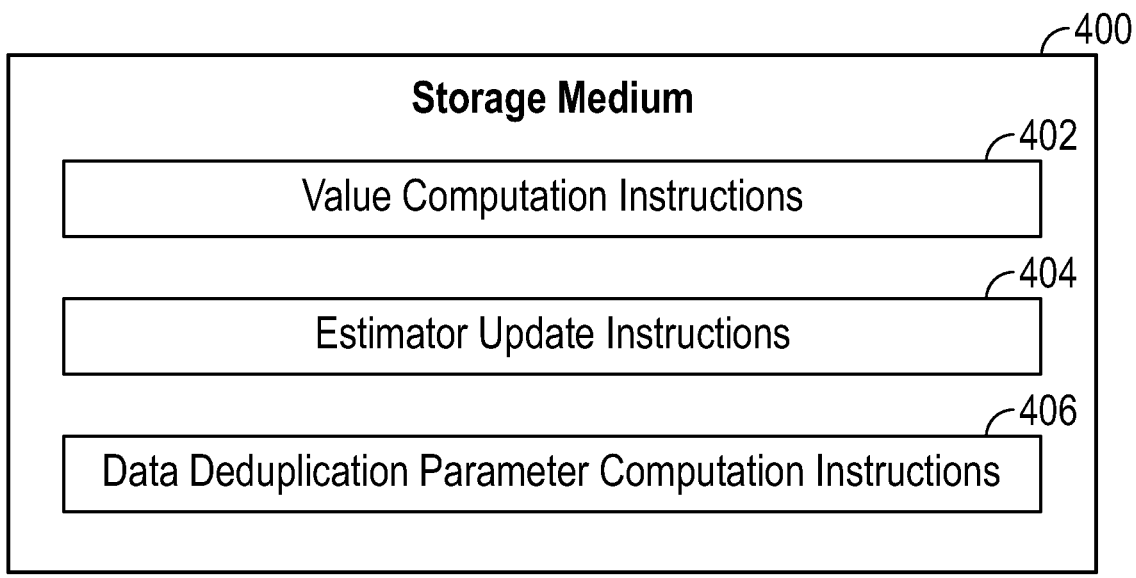
FIG. 4 is a block diagram of a storage medium storing machine-readable instructions, according to some examples.

FIG. 4 is a block diagram of a non-transitory machine-readable or computer-readable storage medium 400 storing machine-readable instructions that upon execution cause a system to perform various tasks. The system can include a computer or a collection of computers. For example, the system can include the storage controller 108 of FIG. 1.

The machine-readable instructions include value computation instructions 402 to compute respective values (e.g., SBN hash values) for corresponding data value indicators (e.g., SBNs) added to and removed from a deduplication data store in which duplicated data values have been eliminated. Each respective data value indicator of the data value indicators represents presence of a unique data value in the deduplication data store. A "deduplication data store" refers to a data store, such as implemented using the data storage system 102, in which data deduplication is applied to reduce or avoid the storing of duplicate data values.

The machine-readable instructions include estimator update instructions 404 to update an estimator (e.g., the probabilistic cardinality estimator 136 of FIG. 1) based on the respective values, to reflect an addition of a first data value indicator (e.g., first SBN) to the deduplication data store and a removal of a second data value indicator (e.g., second SBN) from the deduplication data store.

The machine-readable instructions include data deduplication parameter computation instructions 406 to compute, using the updated estimator, a parameter relating to data deduplication at the deduplication data store.

In some examples, the machine-readable instructions compute a first value (e.g., a first SBN hash value) based on the first data value indicator, and update an entry of the estimator (e.g., by incrementing a count in the entry) based on the first value indicator, to reflect the addition of the first data value indicator to the deduplication data store. The machine-readable instructions compute a second value (e.g., a second SBN hash value) based on the second data value indicator, and update the entry of the estimator (e.g., by decrementing the count in the entry) based on the second value, to reflect the removal of the second data value indicator from the deduplication data store.

In some examples, the estimator includes an array of entries, where each corresponding value of the respective values (e.g., SBN hash values) maps to a corresponding entry of the array of entries. The updating of the estimator includes updating a count in the corresponding entry based on the corresponding value, the count representing how many of the respective values map to the corresponding entry.

In some examples, the corresponding value (e.g., an SBN hash value) includes a first value portion (e.g., 138-A in FIG. 2) and a second value portion (e.g., 138-B in FIG. 2), the first value portion mapping to a column of the array of entries, and the second value portion (more specifically, a quantity of trailing zeros of the second value portion) mapping to a row of the array of entries.

In some examples, a position of a first entry containing a non-zero count in the array of entries indicates a first estimate of how many unique data values are in a portion of the deduplication data store, and a position of a second entry containing a non-zero count in the array of entries indicates a second estimate of how many unique data values are in the portion of the deduplication data store. The first entry can be in a first column of the array of entries, and the second entry can be in a second column of the array of entries. The parameter can be computed based on the first estimate and the second estimate, such as by computing a harmonic mean based on maximum orders in corresponding columns of the cardinality estimator 136 discussed further above.

In some examples, the estimator tracks hash values with quantities of trailing zeros within a specified range, and the estimator does not track hash values with quantities of trailing zeros outside the specified range.

Figure 5:
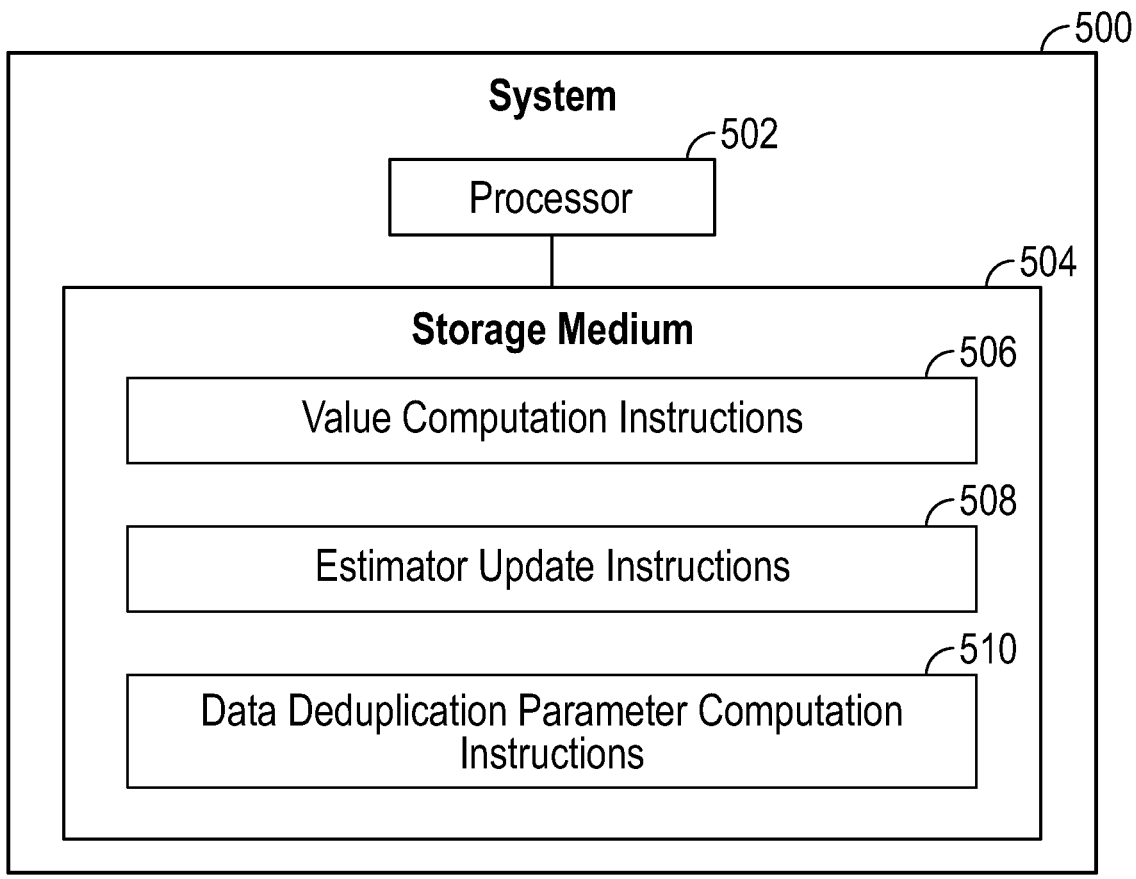
FIG. 5 is a block diagram of a system according to some examples.

FIG. 5 is a block diagram of a system 500, which can include a computer or a collection of computers. For example, the system 500 can be the data storage system 102 of FIG. 1, or the storage controller 108 of FIG. 1.

The system 500 includes a hardware processor 502 (or alternatively, multiple hardware processors. A hardware processor can include a microprocessor, a core of a multi-core microprocessor, a microcontroller, a programmable integrated circuit, a programmable gate array, or another hardware processing circuit.

The system 500 includes a non-transitory storage medium 504 storing machine-readable instructions executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include value computation instructions 506 to compute respective values (e.g., SBN hash values) for corresponding storage location indicators (e.g., SBNs) added to and removed from a deduplication data store in which duplicated data values have been eliminated. Each respective storage location indicator of the storage location indicators represents a respective storage location of a unique data value in the deduplication data store.

The machine-readable instructions in the storage medium 504 include estimator update instructions 508 to update an estimator based on the respective values, to reflect an addition of a first storage location indicator to the deduplication data store and a removal of a second storage location indicator from the deduplication data store.

The machine-readable instructions in the storage medium 504 include data deduplication parameter computation instructions 510 to compute, using the updated estimator, a parameter relating to data deduplication at the deduplication data store.

Figure 6:
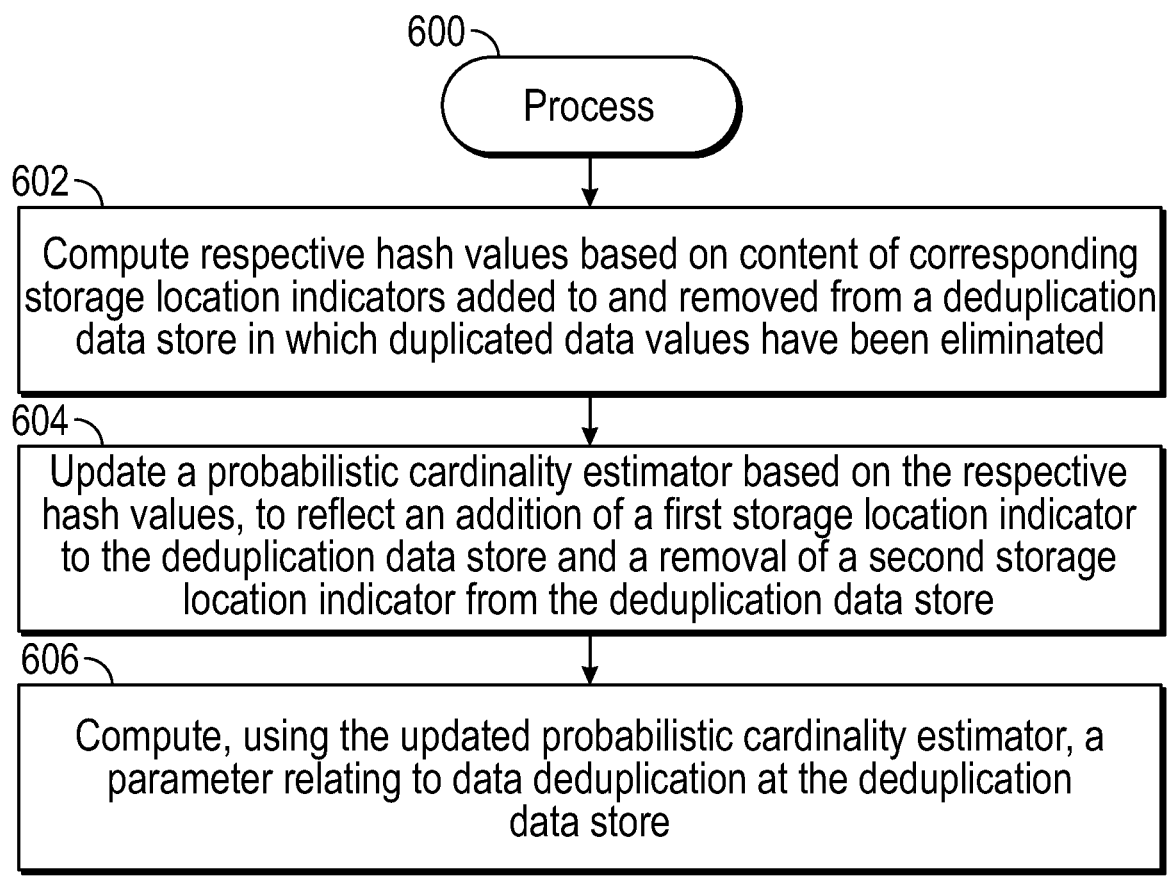
FIG. 6 is a flow diagram of a process of computing a data de-duplication parameter, according to some examples.

FIG. 6 is a flow diagram of a process 600, which can be performed by the storage controller 108 or another machine.

The process 600 computes (at 602) respective hash values based on content of corresponding storage location indicators added to and removed from a deduplication data store in which duplicated data values have been eliminated, where each respective storage location indicator of the storage location indicators represents a respective storage location of a unique data value in the deduplication data store.

The process 600 updates (at 604) a probabilistic cardinality estimator based on the respective hash values, to reflect an addition of a first storage location indicator to the deduplication data store and a removal of a second storage location indicator from the deduplication data store. The probabilistic cardinality estimator includes counters, and the updating includes advancing a first counter of the counters responsive to the addition of the first storage location indicator, and reversing the first counter responsive to the removal of the second storage location indicator.

The process 600 computes (at 606), using the updated probabilistic cardinality estimator, a parameter relating to data deduplication at the deduplication data store.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system comprising a hardware processor to:
   receive write requests to add a first data value to and remove a second data value from a deduplication data store in a storage system comprising persistent storage:
   perform deduplication for the first data value;
   add, in response to adding the first data value, a first storage location indicator to the deduplication data store, the first storage location indicator indicating storage location of the first data value;
   remove, in response to removing the second data value, a second storage location indicator from the deduplication data store, the second storage location indicator indicating a storage location of the second data value;
   compute respective first and second output values based on applying a function on the first and second storage location indicators, wherein each respective storage location indicator of the first and second storage location indicators represents presence of a unique data value in the deduplication data store;
   update a first entry of an estimator based on the first output value, to reflect the addition of the first storage location indicator to the deduplication data store;
   update a second entry of the estimator based on the second output value, to reflect the removal of the second storage location indicator from the deduplication data store; and
   compute, using the updated estimator, a parameter relating to data deduplication at the deduplication data store.

2. The non-transitory machine-readable storage medium of claim 1, wherein the function is a hash function, the first output value is a first hash value based on applying the hash function on the first storage location indicator, and the second output value is a second hash value based on applying the hash function on the second storage location indicator.

3. The non-transitory machine-readable storage medium of claim 1, wherein the updating of the first entry of the estimator based on the first output value comprises advancing a count in the first entry, and wherein the updating of the second entry of the estimator based on the second output value comprises reversing a count in the second entry.

4. The non-transitory machine-readable storage medium of claim 1,
   wherein the parameter represents how many unique data values are present in a portion of the deduplication data store.

5. The non-transitory machine-readable storage medium of claim 1,
   wherein the parameter represents a similarity between a plurality of data volumes of the deduplication data store.

6. The non-transitory machine-readable storage medium of claim 1,
   wherein the parameter represents how many unique data values are present in a first portion of the deduplication data store and not present in any other portion of the deduplication data store.

7. The non-transitory machine-readable storage medium of claim 1,
   wherein the parameter represents a deduplication ratio of a portion of the deduplication data store.

8. The non-transitory machine-readable storage medium of claim 1,
   wherein the parameter represents how many physical blocks of the deduplication data store would be reclaimed responsive to a deletion of a portion of the deduplication data store.

9. The non-transitory machine-readable storage medium of claim 1, wherein the estimator comprises an array of entries, and wherein each corresponding value of the first and second output values maps to a corresponding entry of the array of entries.

10. The non-transitory machine-readable storage medium of claim 9,
    wherein the corresponding value comprises a first value portion and a second value portion, the first value portion mapping to a column of the array of entries, and the second value portion mapping to a row of the array of entries.

11. The non-transitory machine-readable storage medium of claim 10, wherein a position of the first entry containing a non-zero count in the array of entries indicates a first estimate of how many unique data values are in a portion of the deduplication data store.

12. The non-transitory machine-readable storage medium of claim 11, wherein a position of the second entry containing a non-zero count in the array of entries indicates a second estimate of how many unique data values are in the portion of the deduplication data store,
wherein the computing of the parameter is based on the first estimate and the second estimate.

13. The non-transitory machine-readable storage medium of claim 2, wherein a quantity of trailing zeros in the first hash value indicates an estimate of how many unique data values are in a portion of the deduplication data store.

14. The non-transitory machine-readable storage medium of claim 13,
wherein the estimator tracks hash values with quantities of trailing zeros within a specified range, and the estimator does not track hash values with quantities of trailing zeros outside the specified range.

15. A system comprising:
a processor; and
a non-transitory storage medium storing instructions executable on the processor to:
receive write requests to add a first data value to and remove a second data value from a deduplication data store in a storage system comprising persistent storage:
perform deduplication for the first data value:
add, in response to adding the first data value, a first storage location indicator to the deduplication data store, the first storage location indicator indicating a storage location of the first data value;
remove, in response to removing the second data value, a second storage location indicator from the deduplication data store, the second storage location indicator indicating a storage location of the second data value;
compute respective first and second output values based on applying a function on the first and second storage location indicators, wherein each respective storage location indicator of the first and second storage location indicators represents presence of a unique data value in the deduplication data store;
update a first entry of an estimator based on the first output value, to reflect the addition of the first storage location indicator to the deduplication data store;
update a second entry of the estimator based on the second output value, to reflect the removal of the second storage location indicator from the deduplication data store; and
compute, using the updated estimator, a parameter relating to data deduplication at the deduplication data store.

16. The system of claim 15, wherein the estimator comprises an array of entries, each respective entry of the array of entries comprising a respective counter, and wherein the instructions are executable on the processor to:
increment a counter in the first entry of the array of entries in response to the addition of the first storage location indicator, wherein the first output value computed for the first storage location indicator maps to the first entry; and
decrement the counter in the second entry in response to the removal of the second storage location indicator, wherein the second output value computed for the second storage location indicator maps to the second entry.

17. The system of claim 16, wherein the first output value comprises a first portion and a second portion, the first portion mapping to a column of the array of entries, and a quantity of trailing zeros in the second portion mapping to a row of the array of entries.

18. The system of claim 16, wherein the computing of the parameter relating to data deduplication at the deduplication data store is based on non-zero counts maintained by the counters in the array of entries.

19. A method of a system comprising a hardware processor, comprising:
receiving write requests to add a first data value to and remove a second data value from a deduplication data store in a storage system comprising persistent storage;
performing deduplication for the first data value;
adding, in response to adding the first data value, a first storage location indicator to the deduplication data store, the first storage location indicator indicating a storage location of the first data value;
removing, in response to removing the second data value, a second storage location indicator from the deduplication data store, the second storage location indicator indicating a storage location of the second data value;
computing respective first and second hash values based on content of the first and second storage location indicators added to and removed from the deduplication data store, wherein each respective storage location indicator of the first and second storage location indicators represents presence of a unique data value in the deduplication data store;
updating a first entry of a probabilistic cardinality estimator based on the first hash value, to reflect the addition of the first storage location indicator to the deduplication data store;
updating a second entry of the probabilistic cardinality estimator based on the second hash value, to reflect the removal of the second storage location indicator from the deduplication data store, wherein the probabilistic cardinality estimator comprises counters, and the updating of the first entry and the second entry comprises advancing a first counter in the first entry, and reversing a second counter in the second entry; and
computing, using the updated probabilistic cardinality estimator, a parameter relating to data deduplication at the deduplication data store.

20. The method of claim 19, further comprising:
computing a further probabilistic cardinality estimator updated responsive to hash values computed based on data values stored in the deduplication data store,
the further probabilistic cardinality estimator when compared to another probabilistic cardinality estimator based on data values stored in another deduplication data store providing an indication of similarity between the deduplication data store and the another deduplication data store.

* * * * *